Oct. 1, 1929.  H. C. STEARNS  1,730,173

GASOLINE GAUGE FOR AUTOMOBILES

Filed March 13, 1925  2 Sheets-Sheet 1

Inventor
Harry C. Stearns
By Cameron A. Whitsett
Atty

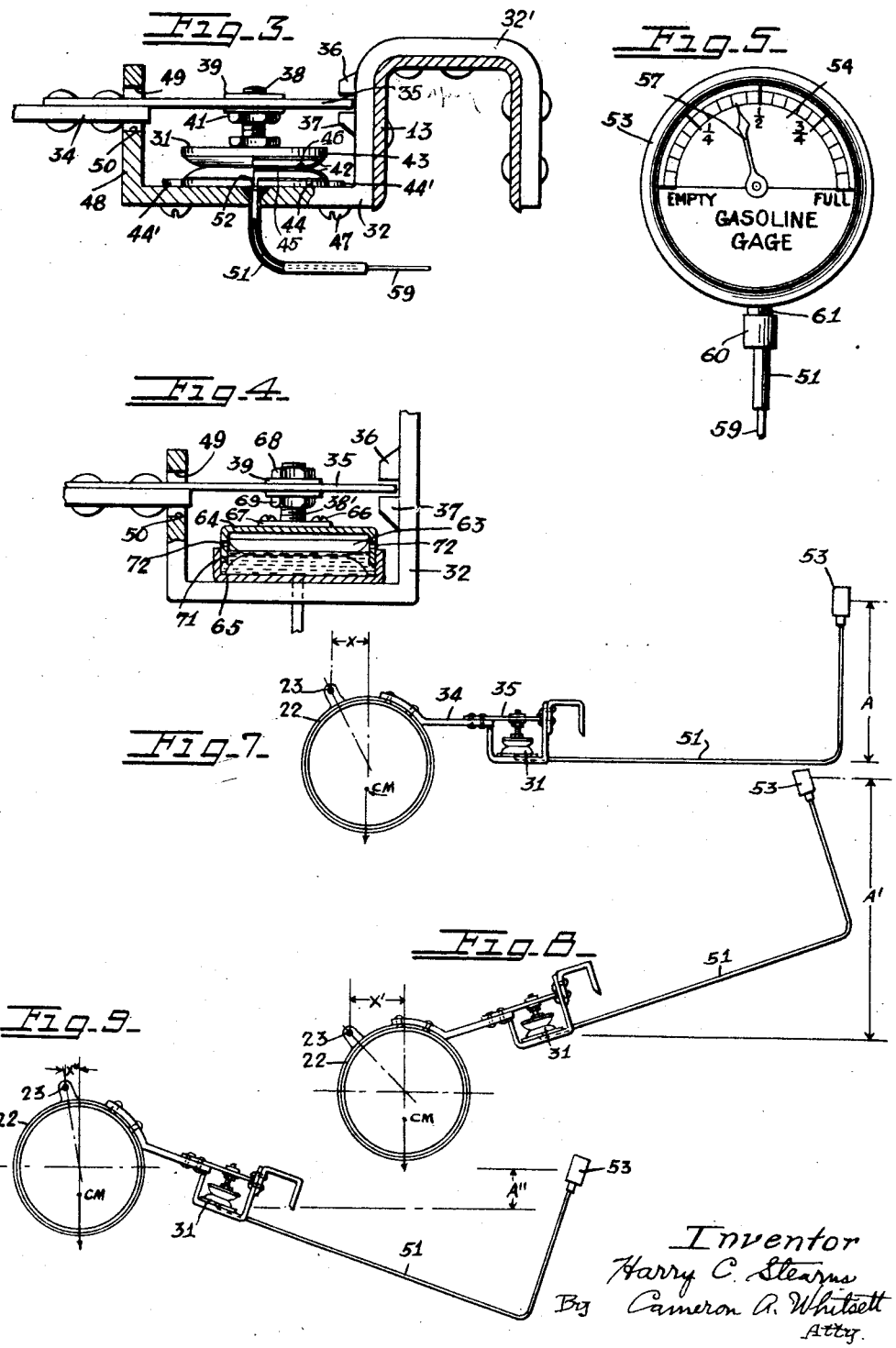

Patented Oct. 1, 1929

1,730,173

UNITED STATES PATENT OFFICE

HARRY C. STEARNS, OF OAK PARK, ILLINOIS, ASSIGNOR OF ONE-THIRD TO CAMERON A. WHITSETT, OF CHICAGO, ILLINOIS, AND ONE-THIRD TO HOMER W. LARSON, OF DOWNERS GROVE, ILLINOIS

GASOLINE GAUGE FOR AUTOMOBILES

Application filed March 13, 1925. Serial No. 15,281.

The present invention relates to gasoline gauges for automobiles, and particularly to that type of gauge adapted to indicate by an instrument located on the dashboard the quantity of gasoline in the main supply tank.

One of the principal objects of the invention is to provide a gauge of the above type which will be of sturdy, rugged construction and which will be more positive in its operation than gauges heretofore provided.

Other objects will be apparent from the following description of a preferred embodiment of my invention, taken in connection with the accompanying drawings, in which:

Figure 3 is a fragmentary sectional view showing the sylphon bellows and the operative connection of the tank thereto;

Figure 4 is a similar view showing a dashpot associated with the bellows chamber;

Figure 5 is an elevational view of a typical form of gauge instrument for mounting on the dash;

Figures 7, 8 and 9 are diagrammatic illustrations showing the automatic correction of the gauge for different inclinations of the car.

Figure 1:
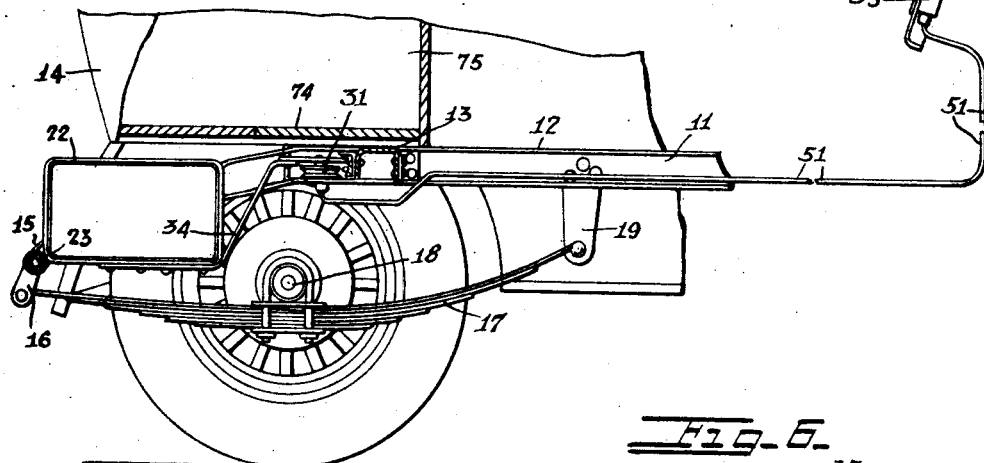
Figure 1 is a fragmentary sectional view through an automobile illustrating the application of my improved gauge thereto.
Figure 2:
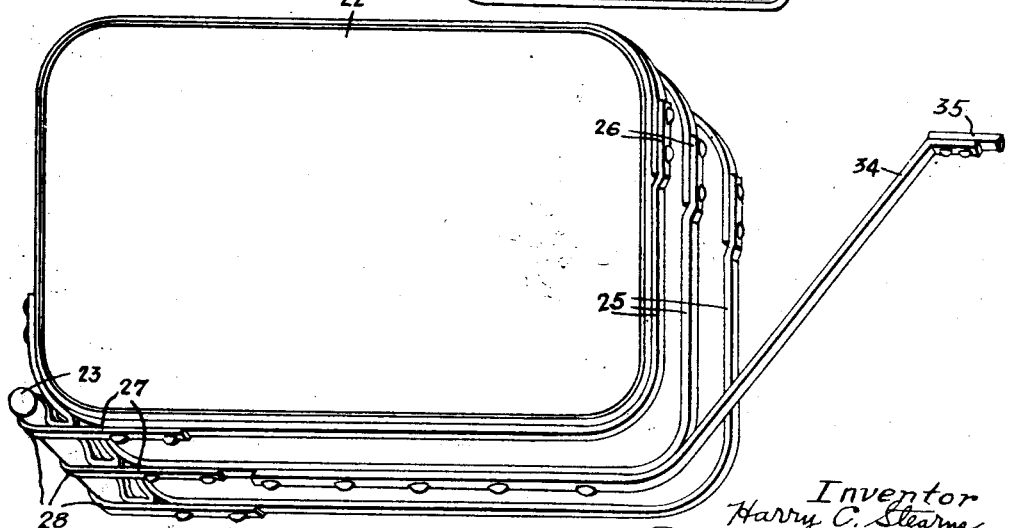
Figure 2 is a perspective view of the gasoline tank, showing one method of pivotal mounting.

Figure 1 illustrates the mounting of the gasoline tank and the mounting of the compressible chamber of the present device in relation to a standard chassis construction. The chassis frame 11 generally comprises two side rails 12 joined by a plurality of reinforcing cross channels 13. The tonneau or body portion of the car, fragmentarily illustrated at 14, is supported on this chassis frame 11. The rear ends of the side frame members 12 are usually curved downwardly to support shackle eyes 15 for making pivotal connection to the shackle links 16. These shackle links have pivotal connection with the leaf springs 17 on which the rear axle assembly 18 is mounted, the front ends of the leaf springs 17 having pivotal connection to suitable hanger brackets 19 which are secured to the side members 12 of the frame. The dashboard is fragmentarily illustrated at 21, the indicating instrument being mounted on this dashboard, as I shall presently describe.

Where the gasoline supply tank is supported at the rear of the car, it is generally located in the position indicated at 22 in Fig. 1. I retain this same location of the gas tank, so that the adaptation of my invention to an automobile does not require any material alteration in the standard chassis design. According to my invention, I propose supporting this gas tank 22 so that the latter is free to pivot or tilt under the weight of the tank and its contents, and I then utilize the moment of the tank and its contents to exert a pressure on a compressible chamber which acts on a contained body of fluid to transmit a fluid pressure to an indicating instrument on the dash. One method of tiltably supporting this tank 22 is to extend a pivot shaft 23 through the shackle eyes 15 in the ends of the frame members 12 and have the tank pivotally supported on this pivot shaft. This enables me to use standard parts of the chassis assembly for securing the pivotal mounting of the tank without the necessity of adding any pivot supporting parts to the chassis frame. Fig. 2 illustrates in detail such a method of pivotal mounting of the tank. The tank 22 is reinforced by a plurality of metallic straps 25 which encircle the tank and have their ends riveted together at 26. The pivotal mounting of the tank on the shaft 23 is effected through a plurality of brackets or straps 27 which are riveted to the straps 25 at the lower outer corner of the tank. These pivot brackets or straps 27 have loops or eyes 28 through which passes the shaft 23. The pivotal rotation may occur between the eyes 28 and the shaft 23, or between the ends of the shaft 23 and the eyes 15 of the frame members.

With this location of the pivotal axis 23 along the rear side or edge of the tank, it will be evident that the weight of the entire tank and its contents will constitute a moment arm swinging about the pivot 23, the moment of which will vary with the quantity of gasoline in the tank. I apply this moment arm to an expansible and compressible chamber 31, located adjacent the front edge of the tank. The adaptation of the present device to standard automobile construction is simplified by supporting this compressible chamber on one of the cross channels 13. In Fig. 3 I have shown the chamber 31 mounted on the top of a supporting bracket 32 which has a U-shaped saddle portion 32' which extends across the top of the cross channel 13. This U-shaped portion is bolted or riveted to the channel 13 at approximately the center of the channel so as to dispose the compressible chamber 31 substantially centrally with respect to the lateral ends of the tank. The weight of the tank and its contents is transmitted to this chamber 31 through an arm 34 which extends up from the bottom of the tank across the top of the compressible chamber 31. This arm may consist of a bar riveted to the central strap 25, as shown in Fig. 2, or it may embody a plate portion extending across the bottom of the tank for attachment to the several straps 25.

The arm may be rigid in its entirety or may embody a resilient portion for absorbing throw or vibration of the tank. The latter construction is preferable, this latter construction being exemplified by a section of leaf spring 35 which is riveted to the end of the arm 34. This section of leaf spring 35 will transmit the weight of the tank and its contents to the compressible chamber 31 at all times, but, in addition, will absorb vibratory movements or any throw of the tank incident to road shocks, and minimize their effect on the compressible chamber 31. To positively limit the movement of the tank, such as might result from vibration or road shock, I propose providing limiting stops 36 and 37 which cooperate with the end of the leaf spring 35. These stops may be formed as shoulders engaging above and below the end of the leaf spring, the shoulders being formed as integral portions of the supporting bracket 32 or as parts of a bracket which is riveted thereto. The deflection which it is necessary to obtain in the compressible chamber 31, in order to secure the proper reading at the instrument on the dashboard, is very small, and accordingly, these stops 36 and 37 can be located in close proximity to the leaf spring 35, whereby any vibration or throw of the tank will be stopped or damped before it reaches any magnitude.

The moment of the tank and its contents is transmitted to the compressible chamber 31 through an adjustable stud 38 carried in the end of the leaf spring 35. This stud is threaded for screwing into a threaded bushing 39 which is secured in an aperture in the section of leaf spring and is locked in any adjusted setting by a locknut 41. The stud 38 is adjusted so that the end of the leaf spring 35 will lie midway between the stops 36 and 37 when the tank is half full of gasoline.

The construction of compressible chamber 31, which I have illustrated in Fig. 3, is advantageous in the present situation, as it is peculiarly adapted to carrying the vertical force moment of the tank and its contents, and any lateral stresses to which it may be subjected. It comprises two curved metallic walls 42, the outer peripheries of which are soldered or otherwise secured to upper and lower plates 43 and 44. The two walls 42 have central openings 45, and one of these walls has its inner peripheral edge flanged over the inner peripheral edge of the other wall around the margin of this opening, as indicated at 46. This flanged joint is soldered to hermetically seal the chamber at this joint. This construction of compressible chamber is capable of carrying a relatively heavy pressure without deformation of the walls, and is also capable of resisting any lateral stresses which the arm 34 might impart to this chamber.

This bellows chamber or sylphon is fixedly secured to the horizontal shelf portion of the supporting bracket 32 by screws 47 which pass up through apertures in the bracket and tap into ears 44' projecting from the bottom plate 44 of the chamber.

The rear end of the supporting bracket 32 has an upward extension 48 having a slot or similar opening therein through which pass the rigid portion of the pressure arm 34 and the section of leaf spring 35. The top and bottom shoulders 49 and 50 of this opening form positive limiting stops cooperating with the substantially rigid portion of the pressure arm 34 for limiting throw or movement of the tank. These latter stop shoulders are spaced farther apart than the limiting shoulders 36 and 37, and in ordinary usage the engagement of the spring arm 35 with these closer shoulders 36 and 37 will limit the movement of the tank. In the case of a very severe shock, however, the other shoulders 49 and 50 are present to positively limit the throw or vibration of the tank. In the event of breakage of the leaf spring 35 the lower shoulder 50 will be engaged by the relatively rigid arm 34 and will prevent the tank from dropping down.

The tube 51 which transmits the fluid pressure from the bellows chamber 31 to the instrument on the dash passes up through a hole in the bracket 32 and has its end hermetically sealed in an opening in the bottom plate of the chamber. This may be accomplished by soldering the end of the tube to the bottom plate as indicated at 52. The indicating instrument 53, mounted on the dash 21, is preferably a Bourdon tube gauge having its dial 54 calibrated to read in gallons or fractional parts of the tank capacity. The Bourdon tube is, of course, connected to the end of the tube 51, and this Bourdon tube has operative connection through the usual sector gear and pinion for operating a pointer 57. This type of instrument is advantageous in that it can be hermetically sealed after the fluid system is completely filled and the gauge properly calibrated. Thus, all possibility of loss of the liquid by evaporation or from jarring of the car is avoided. The fluid system is filled with a suitable non-freezing solution, such as a mixture of alcohol and water or a saline solution.

While a diaphragm chamber can be employed as the compressible chamber, attention is directed to the fact that the metallic bellows or sylphon 31 has advantageous co-operation with the present system because it will accommodate all of the expansion and contraction which can occur in the system, the upper plate 43 of this chamber 31 merely rising and falling with such expansion and contraction and maintaining the same constant pressure on the fluid body that is applied thereto from the supply tank and its contents. This compensating action is not practicably obtainable in a diaphragm chamber having flexible diaphragm for one or both end walls. The flexure of these diaphragms is comparatively limited, and when the diaphragm occupies a position flexed to either side of normal a different degree of pressure or moment arm is necessary to give the same gauge reading than when the diaphragm occupies a normal position.

A wire 59 is preferably threaded through the tube 49 from the bellows chamber 31 to the indicating instrument on the dash so as to reenforce the tube against kinking or breaking. By the provision of this wire, a fluid passageway is maintained through any angle or kink into which the tube may be bent. The tube can be threaded along the under side of the car and around various angles and supports without kinking or breaking. The gauge may be supplied for installation with the compressible chamber 31 and tube 51 completely filled or charged with its fluid, the end of the tube being sealed for threading to the instrument on the dash. After installing the tube, the sealed end is opened and is connected to the instrument, the compressible chamber 31 being capable of carrying sufficient excess fluid for filling the Bourdon tube. After being led up to the gauge 53 on the dash the end of the tube may be attached to the nipple end 61 of the gauge in any suitable manner, such as by a suitable coupling 60. The joint of this coupling can be soldered over for a hermetic seal where such is desired, or the end of the tube can be soldered directly to the nipple end of the gauge.

In Figure 4 I have illustrated damping means in the form of a dash-pot to absorb vibration or throw of the tank. This dash-pot can be readily associated with the compressible chamber 31. In the arrangement shown, the compressible chamber 31 is housed in a dash-pot chamber 63 constructed of upper and lower cup-like shells 64 and 65, the upper shell telescoping in the lower shell. The lower shell is rigidly secured to the supporting bracket 32 in any suitable manner, as by the screws 47 and ears 44', and the upper shell 64 is secured fast by screws 66 to a collar or flange 67 forming part of the adjusting stud 38'. In this instance the bore of the bushing 39 is unthreaded for free movement of the stud 38' therein, and the stud is given different adjustments in this bushing by nuts 68 and 69 which engage the upper and lower sides of the bushing. The top and bottom walls 43 and 44 of the bellows chamber 31 are preferably secured to their respective shells 64 and 65. The two shells have a relatively snug sliding fit and the interior of the resulting chamber is partly filled with a quantity of lubricating oil 71 which maintains the contacting walls of the shells lubricated and assists in maintaining a tight seal between these walls. One or more restricted vent orifices 72 may be provided in the upper shell to permit the slow ingress and egress of air. It will be noted that I have shown these orifices located in position to be closed by the upper edge of the lower shell when the shells move towards each other an appreciable distance. After these orifices are closed the cups or shells have an accentuated air cushioning action. It will be evident that the dash-pot action of the chamber 63 will be effective for absorbing vibration or throw of the tank either upwards or downwards.

Access to the adjusting stud 38 or 38' and to the nuts 41 or 68 and 69 is readily afforded by providing a removable floor board or plate 74 in the bottom of the rear seat compartment 75 directly above these parts.

Figure 6:
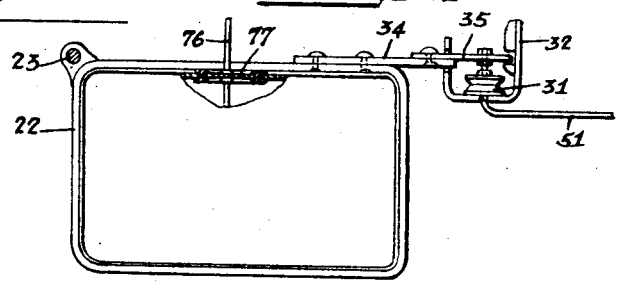
Figure 6 is a fragmentary detail view showing another method of mounting the gasoline tank.

In Fig. 6 I have illustrated a different point of pivotal support for the tank. In this instance the pivot loops or eyes are located at the upper rear corner of the tank. The pivot shaft 23 may be supported at its ends in suitable brackets which can be secured to the frame channels 12 or any other suitable part of the automobile. The arm 34 that transmits the weight of the tank and its contents to the compressible chamber 31 may extend from the top of the tank, as also illustrated in this figure.

The effect of the inclination and declination of the car on hills can be compensated for in the present gauge device by the proper location of the pivot 23. This is attained by the location of the pivot adjacent the upper part of the tank as illustrated in Figure 6, the correcting or compensating action thereof being diagrammatically illustrated in Figures 7, 8 and 9. When the pivot is located substantially as illustrated in these latter figures, the center of mass C.M. of the tank and its contents may be said to have a lever arm X for transmitting the moment of the tank and its contents when the car is substantially horizontal. At this time, the instrument 53 will have a fluid head A above the bottom of the compressible chamber 31. As the car inclines upwardly in the ascent of a hill, the head of the gauge 53 above the bottom of the compressible chamber 31 may be considered to have increased to A'. To compensate for this added counter-head reacting back through the tube 51 and in the chamber 31, a greater moment must be applied to the compressible chamber from the tank and its contents. This occurs at this time by the effective lever arm of the center of mass C.M. increasing to X'. Similarly, when the car declines downwardly in the descent of a hill, the opposing head between the gauge and the bottom of the compressible chamber may be considered as having decreased to A''. At this time, however, the effective lever arm of the center of mass C.M. has also decreased to the length X''. Thus automatic correction will occur for inclination or declination of the car. It will be observed that for the different running positions of the car the effective length of the lever arm from the pivot 23 to the compressible chamber 31 will not vary appreciably, compared to the decided variation in the lever arm X. This length of effective lever arm from the pivot 23 to the chamber 31 may be considered a constant and the mass C.M. may be considered a constant, the factor which corrects or compensates for the change in head A being the varying length of effective lever arm X.

By shifting the pivot 23 farther forward on the top of the tank, a greater corrective effect is obtained, and by shifting it farther backwards or downwards relative to the tank, a lesser corrective effect is obtained. This will hold true generally with circular tanks (Figure 7), with rectangular tanks (Figure 6), or with square or elliptical tanks.

The location of the pivot 23 as shown in Figures 6 and 7 also tends to neutralize or balance out inertia forces set up in the gauge system by the acceleration or deceleration of the car. When the car accelerates, the inertia force of the liquid in the horizontal portion of the tube 51 tends to lower the gauge reading. In opposition to this, the inertia force of the fuel in the tank tends to exert an added moment of force about the pivot 23 to increase the force on the metal bellows. On deceleration, the reverse action is true, the forward inertia of the liquid in the tube 51 being offset by the decreased pressure on the metal bellows. Thus gauge stability is maintained for practically all conditions.

The tilting movement of the tank from one extreme gauge reading to the other is very small and for all practical purposes the resiliency inherent in a short section of the fuel line 76 leading from this tank would be ample to absorb this tilting movement. However, if desired, a flexible or yieldable connection may be made between this fuel line and the tank at the point where the fuel pipe enters the tank. For example, as shown in Fig. 6, the fuel pipe 76 may extend through a leather washer or other flexible member 77 which is supported in an opening in the top of the tank. The outer edge of this leather washer or flexible member is clamped between two screw-threaded clamping rings mounted in the opening in the tank, and the fuel pipe 76 is secured around the edges of its opening in the flexible washer by screw-threaded clamping shoulders carried by the pipe line.

It will be evident from the foregoing that the present construction provides a gauge which is very positive in its operation. Gauges employing floats, Bowden wires, electrical contacts, etc., have such a small operating energy available for their operation (generally the buoyancy of a float) that these devices are very delicate and very susceptible to becoming jammed or otherwise rendered inoperative. By utilizing the pivoted weight of the tank and its contents, the available operating energy in the present gauge is almost infinitely greater than can be obtained with these prior devices. By shifting the location of the compressible chamber 31 relative to the front edge of the supply tank and thereby changing the length of lever arm between the center of gravity of the tank and the chamber 31, different proportions of this pivoted weight can be utilized as desired.

It will furthermore be noted that no part of the present device projects below the bottom of the gasoline tank in position where it might be struck by obstructions on the road. Also, that the present gauge "weighs" the entire quantity of gasoline contained in the tank and not just the head of fuel above a given point, which may vary with different inclinations of the tank. The calibration of the gauge merely requires the filling of the liquid system until the pointer 57 rests on the zero or "Empty" mark, with the tank empty. Calibrating for different weights of tanks and different tank capacities can also be performed by substituting different dial plates 54, or by relatively shifting the dial plate and the pointer 57.

The present tiltable support of the tank has particular cooperation with the intended usage of the gauge. An automobile is subject to more violent jars and shocks than any other vehicle, and accordingly it is very desirable that any movable tank mounted thereon have attachment to the car in such manner that the attachment will bear the brunt of these stresses without injury, and without allowing the tank and its contents to acquire any considerable range of movement relative to the car body or chassis. The pivoting of the present tank on an axis disposed laterally of the center of gravity of the tank provides such an attachment.

It will be obvious that the foregoing gauge device is applicable to steam propelled automobiles for indicating the quantity of kerosene or other liquid in a rear supply tank.

It will be understood that the essential features of my invention can be practiced in a wide variety of forms and that the invention is not to be limited to the particular embodiment herein shown.

I claim:

1. In a dash gauge for indicating the quantity of liquid fuel in the supply tank of an automobile, the combination of pivot means carried by the automobile, a supply tank having permanent pivotal mounting on said pivot means adjacent one edge of the tank, a compressible chamber containing a fluid, means whereby the moment of the weight of said tank and its contents is rendered effective on said compressible chamber, an instrument on the dash of the automobile, and means connecting said instrument with the compressible chamber whereby the instrument is responsive to the variations of pressure in said compressible chamber.

2. In a dash gauge for indicating the quantity of liquid fuel in the supply tank of an automobile, the combination of a supply tank, pivot means carried by the automobile and horizontal when the automobile rests on a horizontal plane and about which said supply tank has swinging pivotal movement about an axis parallel with a vertical plane passing through the center of gravity of said tank and its contents when the automobile is horizontal, a compressible chamber containing a fluid, means for transmitting the moment of the weight of said tank and its contents to said compressible chamber, and an expansible chamber indicating gauge on the dash of the automobile, and means connecting said instrument with the compressible chamber whereby the instrument is responsive to the variations of pressure in said compressible chamber.

3. In a dash gauge for indicating the quantity of liquid fuel in the supply tank of an automobile, pivot means carried by the automobile, pivot means carried by the tank and cooperating with the pivot means carried by the automobile, said pivot means pivoting said tank on a substantially horizontal axis displaced laterally from a vertical plane passing through the center of gravity of said tank and its contents, a hermetically sealed compressible chamber, means for applying the moment arm of the weight of said tank and its contents to said compressible chamber, an indicating instrument on the dash of the automobile and means connecting said instrument with the compressible chamber whereby the instrument is responsive to the variations of pressure in said chamber.

4. In a gasoline gauge for automobiles, the combination of a fuel supply tank, means for connecting said tank to the automobile whereby relative horizontal movement between said tank and the automobile is positively prevented, said means permitting tilting movement between said tank and the automobile under a force dependent upon the quantity of fuel in said tank, stop means for limiting the tilting movement of said tank, a compressible chamber subject to the tilting force of said tank, indicator means mounted on the dash of the automobile, and means connecting said indicator means with the compressible chamber whereby the indicator means is responsive to the pressure in said compressible chamber.

5. In a gasoline gauge for automobiles, the combination of a fuel supply tank, means for connecting said tank to the automobile positively precluding horizontal translational movement of said tank relative to the automobile, said means permitting vertical tilting movement of said tank relative to the automobile, a compressible chamber having flexible side walls, said compressible chamber being subject to the tilting force of said tank, a fluid pressure responsive indicator mounted on the automobile dash, and a pipe line connecting said compressible chamber with said indicator.

6. In a gasoline gauge for automobiles, the combination of a fuel supply tank, means connecting said tank to the automobile positively precluding horizontal or vertical translational motion of said tank relative to the automobile, said means permitting vertical tilting movement of said tank relative to the automobile, said tank establishing a force arm in said tilting movement substantially proportional to the quantity of fuel in said tank, stop means for limiting the range of tilting movement, a compressible chamber operatively associated with said tank and subject to said force arm, a fluid pressure indicator on the dash of the automobile, and a conduit connecting said compressible chamber with said indicator.

7. In a gasoline gauge for automobiles and the like, the combination of a fuel supply tank, means connecting said tank to the automobile, said means positively restraining the horizontal inertia forces of said tank both laterally and longitudinally of the automobile but permitting tilting movement of said tank in a vertical plane, a compressible chamber subjected to the tilting moment of said tank, an indicator, and means connecting said indicator with said compressible chamber whereby said indicator is responsive to the fluid pressure in said compressible chamber.

8. In a gasoline gauge for automobiles, the combination of a main supply tank, means for tiltably supporting said tank on said automobile along a substantially horizontal line disposed to one side of a vertical plane passing through the center of gravity of said tank, a compressible chamber operatively associated with said tank and disposed to the other side of the vertical plane passing through the center of gravity of said tank to be subject to the tilting moment of said tank, indicator means, and means connecting said indicator means with said compressible chamber whereby said indicator means is responsive to the pressure in said compressible chamber.

9. In a gasoline gauge for automobiles, the combination of a fuel supply tank, attaching means for tiltably connecting said tank to the automobile along a line of support disposed laterally of a vertical plane passing through the center of gravity of said tank, an arm secured to said tank and projecting in the other direction from said vertical plane, a compressible chamber subjected to the moment of said arm, a fluid pressure indicator adapted for mounting on the dash of the automobile, and means operatively connecting said indicator to said compressible chamber.

10. In a gasoline gauge for automobiles, the combination of a fuel supply tank, pivot means for pivotally supporting the rear edge of said tank, an arm extending forwardly from the front edge of said tank under the tonneau of the automobile, a compressible chamber subjected to the pressure of said arm, dash indicating means, and means connecting said indicating means with said compressible chamber whereby said indicating means is responsive to the pressure in said chamber.

11. In a gasoline gauge for automobiles, the combination of a fuel supply tank, pivot members carried by the automobile and by the tank cooperating to pivotally support the tank on a pivotal axis extending transversely of the car and adjacent the rear edge of said tank, an arm extending forwardly from the front edge of said tank, a compressible chamber, said arm bearing upon said compressible chamber, a fluid pressure gauge mounted on the dash of the automobile, a conduit connecting said compressible chamber with said gauge, and stop means for limiting the amplitude of pivotal movement of said tank.

12. In a gasoline gauge for automobiles, the combination of a fuel supply tank, means tiltably supporting said tank on the automobile, a compressible chamber subject to the tilting force of said tank, indicator means operatively connected to be responsive to the pressure in said compressible chamber, and yieldable damping means associated with said compressible chamber for damping movement of said tank.

13. In a gasoline gauge for automobiles, the combination of a fuel supply tank, means tiltably supporting said tank on the automobile, a compressible chamber subject to the tilting force of said tank, indicator means, operatively connected to be responsive to the pressure in said compressible chamber, and fluid damping means for damping movement of said tank.

14. In a gasoline gauge for automobiles, the combination of a fuel supply tank, means tiltably supporting said tank on the automobile, a compressible chamber, means whereby said chamber is subject to the tilting force of the weight of said tank, and its contents, indicator means operatively connected to be responsive to the pressure in said compressible chamber, and a dash-pot chamber concentric of said compressible chamber for damping movement of said tank.

15. In a gasoline gauge for automobiles, the combination of a fuel supply tank, means connecting said tank to the automobile whereby said tank is free to have tilting movement relative to the automobile, a compressible chamber subject to the tilting force of said tank, indicator means mounted on the dash of the automobile operatively connected to be responsive to the pressure in said compressible chamber, a dash-pot chamber for damping movement of said tank, said dash-pot chamber comprising vent means, and means for automatically closing said vent means when said dash-pot chamber has its capacity varied a predetermined amount.

16. In a gasoline gauge of the class described, the combination of a fuel supply tank, means for tiltably supporting said tank, a compressible chamber adapted to be subjected to the tilting force of said tank, indicator means operatively connected to be responsive to the pressure in said compressible chamber, and yieldable means interposed between said tank and said compressible chamber.

17. In a gasoline gauge of the class described, the combination of a fuel supply tank, means for tiltably supporting said tank, a compressible chamber adapted to be subjected to the tilting force of the weight of said tank and its contents, indicator means, means connecting said indicator means with said compressible chamber whereby said indicator means is responsive to the pressure in said compressible chamber, and yieldable means through which said tank transmits its tilting moment to said compressible chamber.

18. In a gasoline gauge of the class described, the combination of a fuel supply tank, pivot means about which said tank has swinging pivotal movement under the force of gravity, a compressible chamber, indicator means operatively connected to be responsive to the pressure in said compressible chamber, an arm extending from said tank, and spring means between said arm and said compressible chamber.

19. In a gasoline gauge of the class described, the combination of a fuel supply tank, means for tiltably supporting said tank, a compressible chamber adapted to be subjected to the tilting force of said tank, an indicator operatively connected to be responsive to the fluid pressure in said compressible chamber, an arm extending from said tank to said compressible chamber, a stop cooperating with said arm, and means for adjusting the space between said arm and said stop.

20. In a gasoline gauge of the class described, the combination of a fuel supply tank, means for tiltably supporting said tank, a compressible chamber adapted to be subjected to the tilting force of said tank, an indicator operatively connected to be responsive to the fluid pressure in said compressible chamber, an arm extending from said tank to said compressible chamber, stops cooperating with said arm for limiting the up and down movement of said arm, and means for adjusting the space between said arm and one of said stops.

21. In a gasoline gauge of the class described, the combination of a fuel supply tank, means for tiltably supporting said tank, a compressible chamber adapted to be subjected to the tilting force of said tank, an indicator. means connecting said indicator with said compressible chamber whereby said indicator is responsive to the fluid pressure in said compressible chamber, an arm extending from said tank to said compressible chamber, adjustable screw means between said arm and said chamber, and stops for limiting the motion of said tank.

22. In a gasoline gauge of the class described, the combination of a fuel supply tank, means tiltably supporting said tank, a compressible chamber subject to the tilting force of said tank, indicating means operatively, connected to be responsive to the pressure in said compressible chamber, a stop for limiting the tilting movement of said tank, and adjustable means for adjusting the permissible range of movement of said tank relative to said stop.

23. In a gasoline gauge for automobiles and the like, the combination of a fuel supply tank, supporting means for tiltably supporting said tank, a compressible chamber subject to the tilting force of said tank, and indicating means operatively connected to be responsive to the pressure in said chamber, said supportnig means establishing a pivotal axis for said tank so disposed relative to the center of mass of said tank that automatic correction is applied to said gauge for different inclinations of the automobile in the plane of tilt of the tank.

24. In a gasoline gauge for automobiles, the combination of a fuel supply tank, pivot means supported on the automobile and pivotally supporting said tank for movement under the force of gravity, a compressible chamber, means whereby said compressible chamber is subject to the moment arm of the weight of said pivoted tank and its contents, indicating means, and a liquid pressure transmitting system connecting said indicating means with the compressible chamber whereby said indicating means is responsive to the pressure in said compressible chamber, said pivot means being so disposed relative to the center of mass of said tank that the effective lever arm between said pivot means and said center of mass varies with the inclination of the car to correct automatically for the change in head between the top and bottom points of the liquid system connecting said compressible chamber with said indicating means.

25. In a gasoline gauge for automobiles and the like, the combination of a fuel supply tank, pivot means carried by the automobile about which said supply tank has swinging pivotal movement under the force of gravity, a compressible chamber containing a liquid, said compressible chamber being subject to the moment arm of said pivoted tank, an indicating gauge on the dash of the automobile, and a pipe line connecting said compressible chamber with said gauge to form a pressure responsive fluid system, said pivot means defining a pivot axis for said tank disposed above and to the rear of the center of mass of said tank whereby the effective lever arm between said pivot means and said center of mass varies with the inclination of the car to correct automatically for the change in head in the liquid system between the gauge on the dash and said compressible chamber.

26. In a gasoline gauge for automobiles, the combination of a fuel supply tank, means for tiltably supporting said tank on the automobile, a pressure responsive gauge mounted on the automobile dash, a compressible chamber subject to the tilting force of said tank, and means operatively connected to transmit pressure from said compressible chamber to said gauge, said compressible chamber comprising two shells having flexible side walls, each of said shells having an end of relatively large diameter and an end of smaller diameter, the two ends of said shells of smaller diameter being connected together, and plates closing the ends of larger diameter.

27. In a gasoline gauge for automobiles, the combination of a fuel supply tank, means for tiltably supporting said tank, a pressure responsive gauge mounted on the automobile dash, a metallic bellows subject to the tilting force of said tank, and means operatively connected to transmit pressure from said bellows to said gauge, said metallic bellows being of substantially hour-glass form comprising flexible side walls of relatively large diameter at the ends of said bellows and contracted to a smaller diameter intermediate the ends of said bellows.

28. In a gasoline gauge for automobiles, the combination of a fuel supply tank, means for tiltably supporting said tank, a compressible chamber subject to the tilting force of said tank, indicator means operatively connected to be responsive to the pressure in said compressible chamber, a fuel feed line for said tank, said fuel feed line entering said tank through an opening therein, and a flexible wall closing said opening and connecting said fuel feed line with said tank.

29. An automobile comprising a frame, a tonneau and a dash board in the driver's compartment of said tonneau, a fuel tank, pivot means supporting said tank at the rear of said tonneau, said pivot means restraining the horizontal inertia forces of said tank both laterally and longitudinally of the automobile but permitting tilting movement of said tank, an arm connected to said tank and extending under the tonneau of the automobile, said arm constituting a force arm through which the tilting moment of said tank and its contents is transmitted, a compressible chamber supported under said tonneau and subjected to the tilting moment transmitted through said arm, an indicating gauge on said instrument board, and a liquid conduit connecting said gauge with said compressible chamber.

30. An automobile comprising a frame, a tonneau and an instrument board in the driver's compartment of said tonneau, a fuel tank supported at the rear of said tonneau, pivot means supporting said tank on said frame, said pivot means positively restraining the horizontal inertia forces of said tank both laterally and longitudinally of the automobile but permitting tilting movement of said tank, an arm connected to said tank and extending under the tonneau of the automobile, said arm constituting a force arm through which the tilting moment of said tank and its contents is transmitted, a compressible chamber supported under said tonneau and subjected to the tilting moment transmitted through said arm, an indicating gauge on said instrument board comprising a hermetically sealed expansible chamber having indicating means actuated thereby, and a nonexpansible liquid containing conduit connecting said expansible chamber with said compressible chamber.

31. An automobile comprising a frame, a tonneau and an instrument board in the driver's compartment of said tonneau, a fuel tank supported at the rear of said tonneau, pivot means supporting said tank on said frame, said pivot means positively restraining the horizontal inertia forces of said tank both laterally and longitudinally of the automobile but permitting tilting movement of said tank, an arm connected to said tank and extending under the tonneau of the automobile, said arm constituting a force arm through which the tilting moment of said tank and its contents is transmitted, a compressible chamber supported under said tonneau and subjected to the tilting moment transmitted through said arm, and a Bourdon tube gauge on said instrument board connected to said compressible chamber.

32. In a gasoline gauge for automobiles, the combination of a fuel supply tank, pivot means supporting said tank on the automobile, said pivot means restraining the horizontal inertia forces of said tank both laterally and longitudinally of the automobile but supporting said tank in unbalanced relation to permit substantially vertical tilting movement of the tank and its contents, an indicating gauge on the instrument board of the automobile, means adapted to have a force created therein substantially proportionate to the tilting weight of the contents of the tank, and force transmitting mechanism operatively connected at one end with said last named means and operatively connected at its other end with said gauge to transmit the force of said tilting weight to said indicating gauge for establishing indications at said gauge corresponding to the quantity of fuel in said tank.

In witness whereof, I hereunto subscribe my name this 11th day of February, 1925.

HARRY C. STEARNS.